(12) United States Patent
Liu

(10) Patent No.: US 9,547,134 B2
(45) Date of Patent: *Jan. 17, 2017

(54) TIGHTLY MOUNTABLE OPTICAL FIBER ADAPTER

(71) Applicant: Alliance Fiber Optic Products, Inc., New Taipei (TW)

(72) Inventor: Keng-Hao Liu, Sunnyvale, CA (US)

(73) Assignee: Alliance Fiber Optic Products, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,300

(22) Filed: Jul. 5, 2016

(65) Prior Publication Data

US 2016/0313512 A1 Oct. 27, 2016

Related U.S. Application Data

(63) Continuation of application No. 14/799,716, filed on Jul. 15, 2015, now Pat. No. 9,383,523.

(60) Provisional application No. 61/999,487, filed on Jul. 29, 2014.

(51) Int. Cl.
*G02B 6/38* (2006.01)

(52) U.S. Cl.
CPC .......... *G02B 6/3825* (2013.01); *G02B 6/3879* (2013.01); *G02B 6/3893* (2013.01); *G02B 6/3897* (2013.01); *G02B 6/387* (2013.01); *G02B 6/3874* (2013.01)

(58) Field of Classification Search
CPC ... G02B 6/3893; G02B 6/3825; G02B 6/3897; G02B 6/3885; G02B 6/3887; G02B 6/3821; G02B 6/38
See application file for complete search history.

(56) References Cited

U.S. PATENT DOCUMENTS

| 7,284,912 | B2 | 10/2007 | Suzuki et al. |
| 7,384,200 | B2 | 6/2008 | Nakagawa |
| D608,285 | S | 1/2010 | Sato et al. |
| 9,383,523 | B2 * | 7/2016 | Liu ................... G02B 6/3897 |
| 2007/0230874 | A1 | 10/2007 | Lin |

* cited by examiner

*Primary Examiner* — Jennifer Doan
(74) *Attorney, Agent, or Firm* — Dinsmore & Shohl, LLP

(57) ABSTRACT

The present disclosure provides a tightly mountable optical fiber adapter which has a plurality of mating parts formed at front and rear sides of a base of a shell member thereof, and the base is combined with a base plate and two opposite side panels, each side panel is extended to form a first elastic part, and ends of second elastic parts are respectively outwardly bent and extended to form stop parts whose inner sides are bent towards the first elastic part and extended to form third elastic parts. While shell member is transversely mounted into an installing hole, first elastic parts are abutted and deformed to cross installing hole to clasp back side, second elastic parts are located in installing hole, so that shell member cooperating with mounting spring clip can be tightly fastened in installing hole, whereby the entire structure can be more securer.

20 Claims, 14 Drawing Sheets

TIGHTLY MOUNTABLE OPTICAL FIBER ADAPTER

CROSS-REFERENCE TO RELATED APPLICATIONS

This application is a continuation of U.S. patent application Ser. No. 14/799,716 filed Jul. 15, 2015, which claims the priority benefit of U.S.A. Provisional patent application No. 61/999,487, filed Jul. 29, 2014, both applications are incorporated by reference in their entirety as if fully set forth herein.

BACKGROUND OF THE INVENTION

1. Field of the Invention

The present disclosure relates to an optical fiber adapter and more particularly, to a tightly mountable optical fiber adapter which has a shell member combined with a base plate and two side panels of a mounting spring clip, and each side panel has third elastic parts and first elastic parts for tightly clamping front and back sides of a panel with no gap when the shell member is mounted into an installing hole of the panel, whereby the entire combination structures of the optical fiber adapter and the panel can be securer.

2. Description of the Related Art

In recent years, with rapid development in communication technology and internet, data center venders and telecommunication venders make efforts in fields of high density, high transmission rate, large volume and intelligent equipment. In order to solve the requirements for higher data transmission rate, smaller occupied space and lower power consumption, cabling systems which are an important constitution of physical infrastructure are paid more attention. Electric cables and optical fiber transmission system are two basic transmission mediums in cabling system of the data center. Compared with the electric cable transmission system, the optical fiber transmission system has advantages of larger bandwidth, higher transmission rate, longer transmission distance, thinner volume, better anti-EMI and nice confidentiality, so the optical fiber transmission system will definitely become the future trend.

The optical fiber adapter is a member which is not equipped with light source and widely used in optical fiber transmission system for detachment and connection between optical fibers. Ends of the two optical fibers are precisely aligned with each other and connected through the optical fiber adapter, and the optical signal outputted from the optical fiber of the transmitter can be coupled to the optical fiber of the receiver in maximum degree. Generally, there are many types of small-sized packaged optical fiber connectors, the connector widely used in its field is SC type or LC type, and the LC type optical fiber connector has 6.25 mm of core pitch and 1.25 mm of core alignment and two LC type simplex connectors can then be assembled as a duplex connector. Therefore, the LC type optical fiber connector not only has advantages in size and precise assembly alignment, but also has flexibility in applications of simplex and duplex transmissions both.

However, the plurality of optical fiber connectors are aligned and connected with each other through the internal pipe of the optical fiber adapter. Upon actual application, the user can select the pipe made of ceramic or copper, having high precise dimension, mechanical durability, and very low insertion loss and reflection loss, so that the loss in cross connection between the optical fibers can be ensured to be very low. Please refer to FIG. 10. A traditional optical fiber adapter includes a shell member A defining a plurality of accommodating cavities A1 therein, and sockets A10 are disposed at outer openings of the accommodating cavities A1 respectively, and a central sidewall between each two accommodating cavities A1 defines an optical fiber pipe (not shown in FIGs) transversely penetrated therethrough. Wing plates A2 are respectively protruded at two opposite sides of central portion of the shell member A. Moreover, the shell member A is further combined with a U-shaped installing device B which has elastic fasteners B1 disposed at two opposite lateral sides thereof and obliquely extended towards the wing plates A2 respectively, and while the shell member A is mounted in the installing hole (not shown in FIGs), the wing plates A2 are abutted with a front side of the panel and the elastic fasteners B1 of the installing device B are elastically deformed first to cross the installing hole and then moved to back side of the panel, therefore, the shell member A can be mounted on the panel by a manner of cooperating the wing plates A2 with the elastic fasteners B1.

However, manufacturers may apply panels with different thicknesses, a larger gap may exist between the elastic fastener B1 and the panel after the shell member A is mounted on the panel, so the shell member A is easy to longitudinally swing or shake subject to plugging or impact force when a connecting part of the optical fiber connector is inserted into the accommodating cavity A1 of the shell member A, and it cause that the optical fiber adapter has insufficient pulling out resistance and fastening force of, and it is hard to ensure the structural stability for plugging connections between a plurality of optical fiber connectors through the shell member A, and even the function of optical signal transmission is affected possibly.

Please refer to FIG. 11 which shows other traditional optical fiber adapter. The shell member A of this optical fiber adapter is combined with an installing device B at central portion of a top wall thereof, and the installing device B includes an arched fastening sheet B2 in this embodiment. When the shell member A is inserted into the installing hole of the panel, the wing plates A2 are abutted with the front side of the panel and the fastening sheet B2 is elastically deformed to abut with an inner sidewall of the installing hole for fastening. However, when the optical fiber connector is plugged or impacted to the shell member A, the fastening sheet B2 is still longitudinally elastically deformed to swing or shake with smaller degree.

Moreover, the manufacturer also developed an optical fiber adapter capable of avoiding the shell member A from swinging or shaking subject to external force when the shell member A is installed in the installing hole of the panel. Please refer to FIG. 12 through 14. As shown in FIGs, the shell member A of this traditional optical fiber adapter is combined with an installing device B which has elastic fasteners B1 formed at two opposite lateral sides thereof and obliquely extended towards the wing plates A2 respectively. The installing device B has a first spring clip B3 and a second spring clip B4 respectively formed at upper and lower sides of the elastic fasteners B1 thereof, and the second spring clip B4 is outwardly bent. An end of the first spring clip B3 is downwardly extended first and then inwardly bent to form an abutting end B31 corresponding to the second spring clip B4. When the shell member A is mounted into the installing hole C1 of the panel C, the wing plates A2 are abutted with the front side of the panel C and the elastic fastener B1 of the installing device B are elastically deformed to cross the installing hole C1 and then moved to the back side of the panel C and, meanwhile, the abutting ends B31 of the first spring clips B3 and the second spring clips B4 are respectively abutted with the lateral walls of the shell member A and the inner sidewall of the installing hole C1, so as to avoid the shell member A from swinging or shaking. However, a larger gap still exists between the elastic fastener B1 of the installing device B and the panel C, so the shell member A is still easy to longitudinally swing or shake while the optical fiber connector is plugged or pulled. Therefore, how to improve the structural stability in plugging connection after combination between the shell member A and the panel C is a key point in designing the structure of the installing device B.

SUMMARY OF THE INVENTION

Primary objective of the present disclosure is to provide an optical fiber adapter which includes a shell member having a base combined with a base plate and two side panels of a mounting spring clip, and each side panel is forwardly and obliquely extended to form a first elastic part, and has front parts which are located at upper and lower sides of the first elastic part and extended in the same direction to form second elastic parts, ends of the second elastic parts are respectively outwardly bent to form stop parts, and each two stop parts has inner sides opposite to each other and bent and extended towards the first elastic part to form third elastic parts. While the shell member is transversely mounted into an installing hole of a panel, the first elastic parts are abutted with the inner edge of the installing hole and elastically deformed to cross the installing hole to clasp the back side of the panel, the second elastic parts are located in the installing hole and, meanwhile, the third elastic parts are abutted with the front side of the panel and elastically deformed, so that the front and back sides of the panel are clamped by the third elastic parts and the first elastic parts and no gap exists therebetween, the shell member cooperating with the mounting spring clip can be tightly fastened in the installing hole of the panel, whereby the entire structure can be more securer.

According to other aspect of the present disclosure, the mounting spring clip clamps the front and rear sides of the panel by the first elastic parts and the third elastic parts on the side panels, and the stop parts can further be respectively abutted with the wing parts protruded at central parts of two opposite sides of the shell member to ensure more tightness between the third elastic parts and the first elastic parts. Additionally, after the shell member is fastened, the second elastic parts are abutted with the inner sidewalls of the installing hole with elastic deformation, so that the shell member is not easy to longitudinally swing or transversely shake while bearing the plugging force or impact, to avoid the optical fiber adapter from falling out of the panel. Additionally, the structural design of the panel being clamped by the first elastic parts and the third elastic parts can be applicable to various panels with different thicknesses, so the present disclosure has more practicability and applicability.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
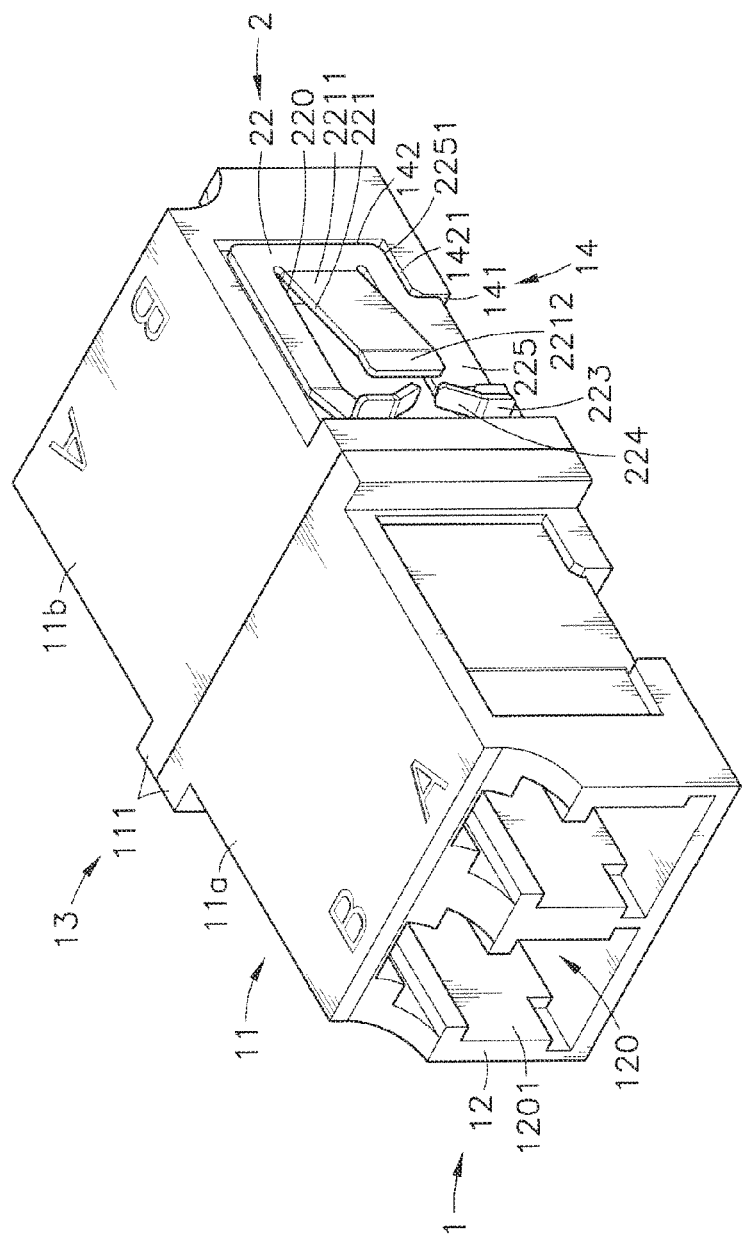
FIG. 1 is an elevational view of an optical fiber adapter of the present disclosure.
Figure 2:
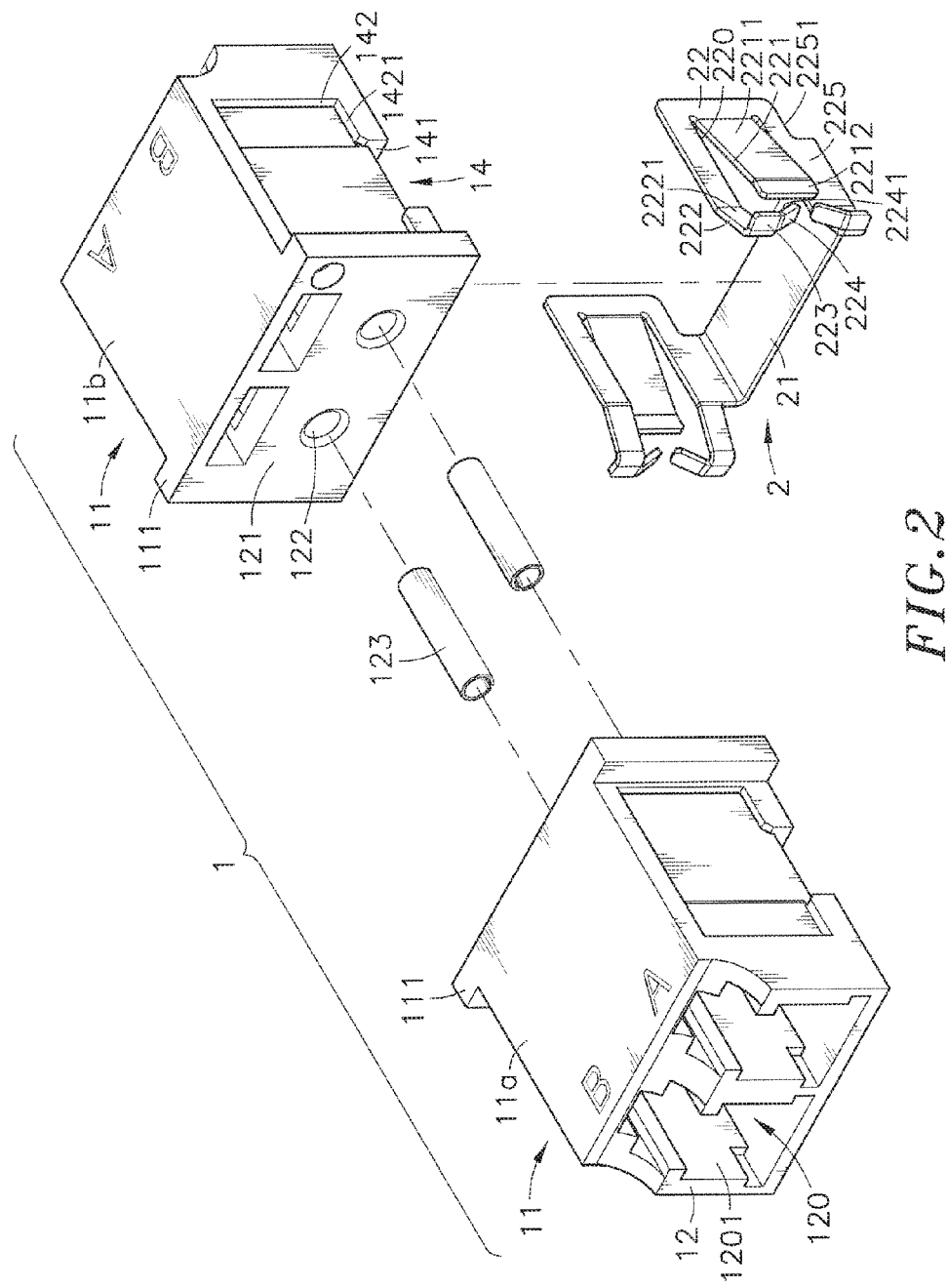
FIG. 2 is an exploded view of the optical fiber adapter of the present disclosure.
Figure 3:
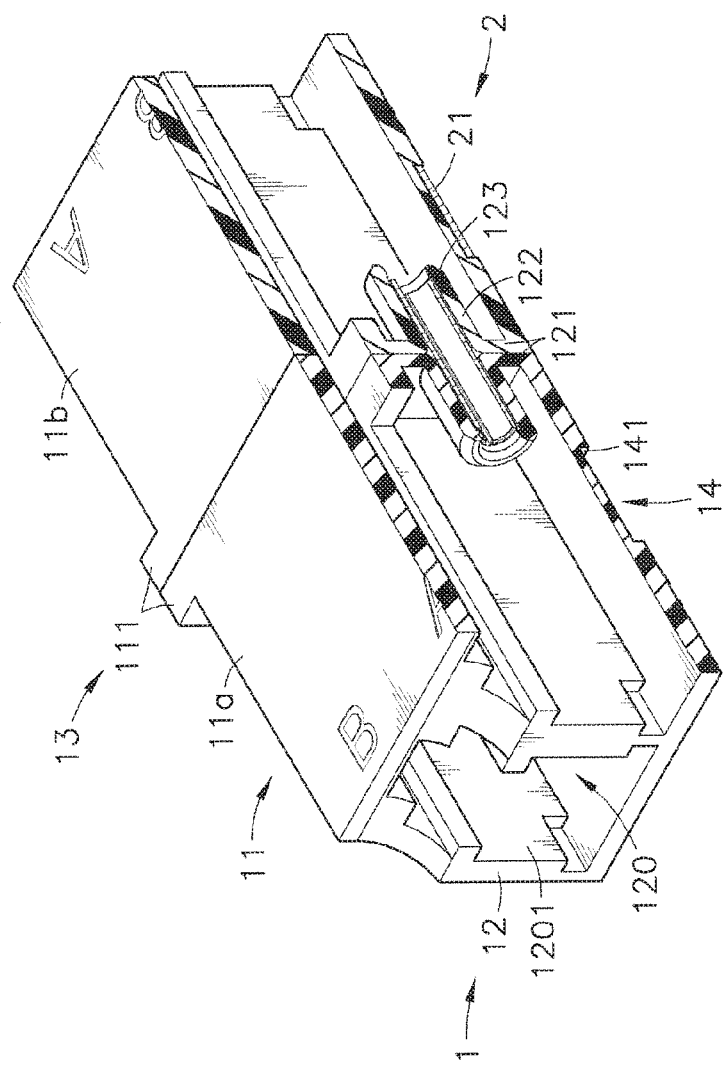
FIG. 3 is a sectional view of the optical fiber adapter of the present disclosure.
Figure 4:
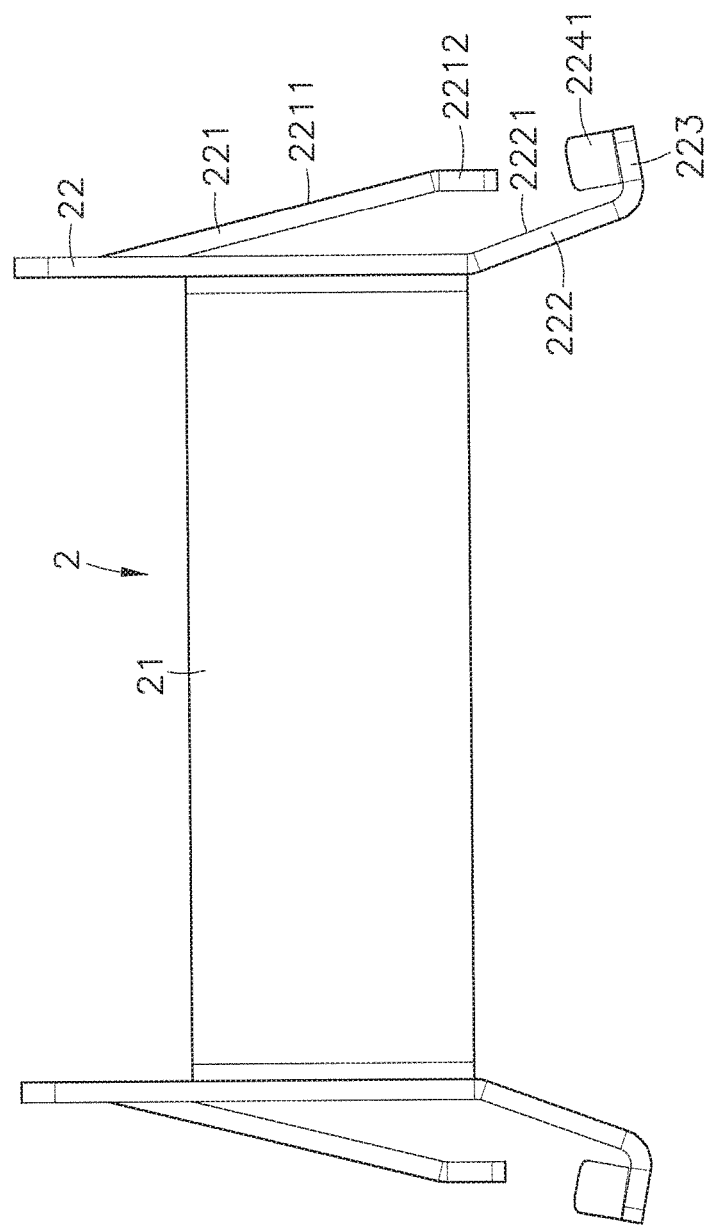
FIG. 4 is a top view of a mounting spring clip of the present disclosure.
Figure 5:
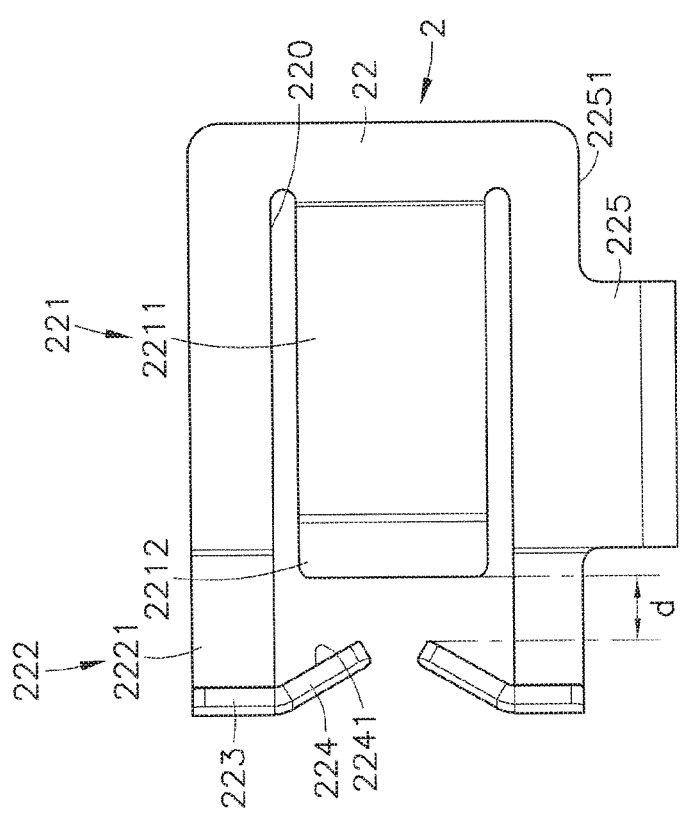
FIG. 5 is a side view of the mounting spring clip of the present disclosure.
Figure 6:
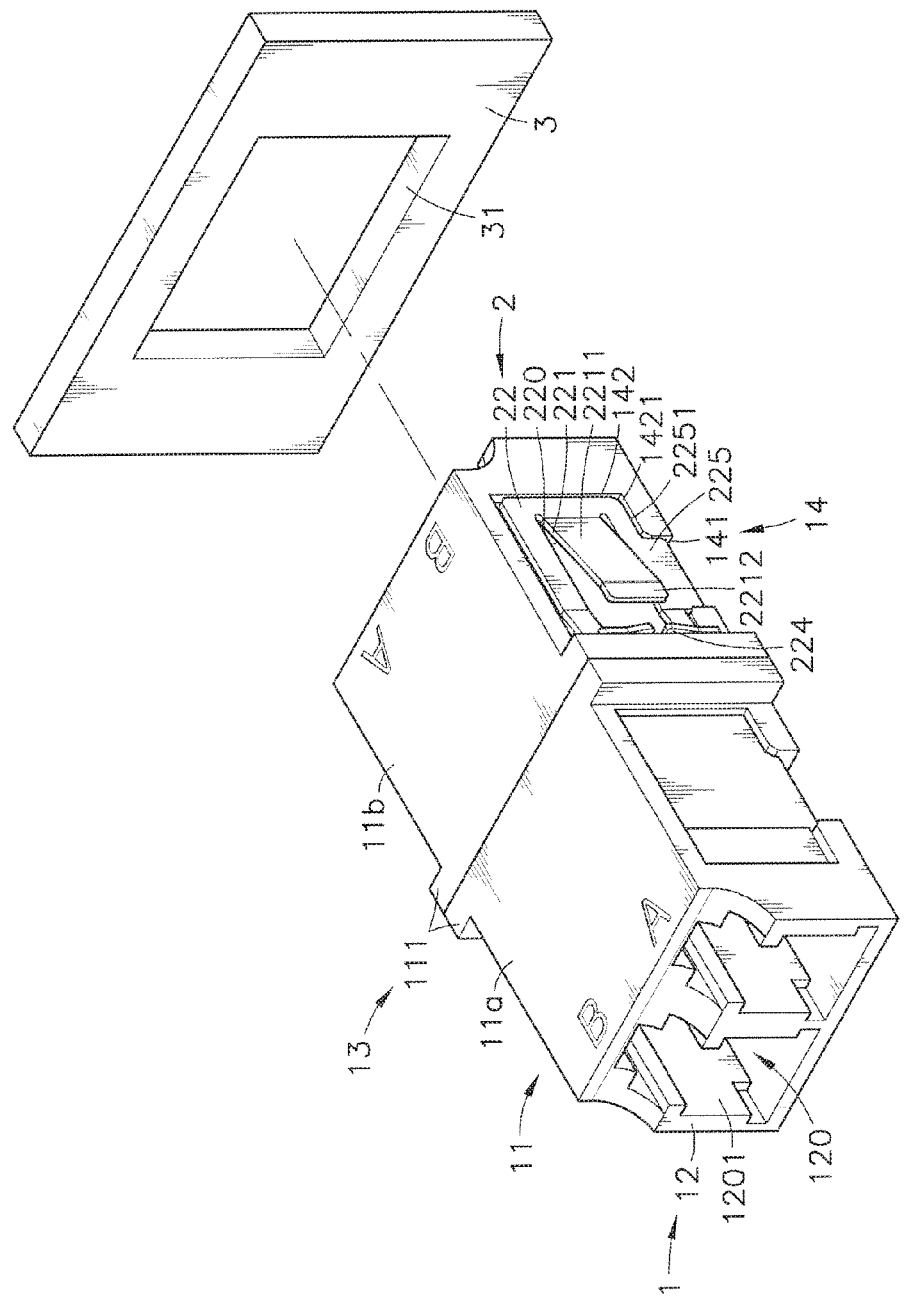
FIG. 6 is an exploded view of a preferred embodiment of the present disclosure before assembly.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 through FIG. 5 which respectively show an elevational view, an exploded view, a sectional view of an embodiment of the present disclosure, and a top view and side view of a spring clip. As shown in FIGs clearly, the optical fiber adapter of the present disclosure includes a shell member 1 and spring clip 2, and main members and features of the present disclosure are described below.

The shell member 1 is a rectangular base 11 having a hollow structure, and the base 11 is formed by a front shell member 11A and a rear shell member 11B which can be a uni-body structure formed integrally or two structures. The base 11 defines a plurality of mating parts 12 formed at front and rear sides thereof, and an accommodating cavity 120 is transversely formed inside and communicated through the each two opposite mating parts 12 and two sockets 1201 are formed at front and rear sides of each accommodating cavity 120. A compartment wall 121 is formed between two opposite accommodating cavities 120, and a hollow-shaped mounting part 122 is transversely extended from the compartment wall 121 towards the accommodating cavity 120, and a transverse pipe 123 is fastened inside two opposite mounting parts 122. The base 11 has a plurality of lips 111 formed of abutting sides of the front shell member 11A and the rear shell member 11B between two mating parts 12 thereof, and the two lips 111 located at a junction between the front shell member 11A and the rear shell member are abutted with each other and securely joined by ultrasonic welding, soldering, laser welding or other joining manner, so as to form wing parts 13.

Moreover, after the wing part 13 by a distance, a recessed part 14 is formed at the bottom wall and two lateral walls of the rear shell member 11B of the base 11, and a fastening groove 141 is transversely formed at the recessed part 14 on the bottom wall of the rear shell member 11B, and the two sides of the fastening groove 141 are upwardly extended to two lateral walls of the rear shell member 11B to form vertical mounting grooves 142, respectively. Step-like stop parts 1421 which are inwardly bent are formed at lower part of the mounting groove 142 and adjacent to the fastening groove 141. The front shell member 11A and the rear shell member 11B of the base 11 can be designed as modularized structures with symmetry, so the front shell member 11A can also have the recessed part 14, and the location of the recessed part 14 will not be changed even if the locations of the front shell member 11A and the rear shell member 11B are exchanged.

Preferably, the base 11 of the shell member 1 cooperating with the pipe 123 can be assembled as a LC type of optical fiber connector; however, there are various structural designs for the shell member 1 and manners of assembling and fastening the shell member 1 and the pipe 123, in actual application, the structural design for the pipe 123 can be changed or omitted to for assembling a SC type, MPO type or other type of optical fiber connector. It should be noted that various equivalent changes, alternations or modifications based on the claims of present disclosure are all consequently viewed as being embraced by the scope of the present disclosure.

The spring clip 2 is a metal sheet made of elastic steel material (such as spring steels) and bent to form a "U" shape having two symmetrical lateral sides. The spring clip 2 has a base plate 21 which is upwardly bent at two opposite sides and extended to form two opposite rectangular side panels 22, and each side panel 22 has a cut hole 220 cut therethrough from a central portion of a front side thereof to a portion near a rear side thereof by a distance. A first elastic part 221 which is forwardly, obliquely and outwardly extended is formed at inner edge of the cut hole 220 and defines a supporting surface 2211 formed on an external surface thereof. A free end of the first elastic part 221 is bent and extended towards the cut hole 220 to form a clasping part 2212. A second elastic parts 222 which are outwardly extended in the same direction, are respectively formed at upper and lower sides of the cut hole 220 in front part of the side panel 22, and each second elastic part 222 defines a pushing surface 2221 formed on external surface thereof. A terminal of each second elastic part 222 is outwardly bent and extended to form a stop part 223 perpendicular to the side panel 22, and each two stop parts 223 respectively define third elastic parts 224 which are oppositely and inwardly bent and extended towards the first elastic part 221 to form third elastic parts 224 respectively, and a predetermined distance d is formed between the free end of the third elastic part 224 and the clasping end 2212 of the first elastic part 221. The third elastic part 224 further defines a pushing surface 2241 formed at external surface thereof facing the first elastic part 221. The spring clip 2 defines an arm 225 formed below the side panel 22 thereof and adjacent to the base plate 21, and the arm 225 defines a jointing surface 2251 inwardly bent and formed at front and rear sides adjacent to the side panel 22.

During assembly of the optical fiber adapter of the present disclosure, base plate 21 of the spring clip 2 is mounted into the corresponding fastening groove 141 in the recessed part 14 of the shell member 1, and the two side panel 22 at two opposite sides of the base plate 21 are respectively inserted into and abutted against the mounting groove 142 in process of being elastically deformed firstly and then restored, and the jointing surface 2251 of the arm 225 clasps the step-like stop part 1421 of the mounting groove 142 for fastening and, at the same time, the first elastic part 221, the second elastic part 222, the stop part 223 and the third elastic part 224 on the two side panels 22 are protruded and exposed around two lateral walls of the base 11, and each stop part 223 is apart from the rear side of the wing part 13 by a distance, thereby complete the entire assembly of the present disclosure.

Figure 7:
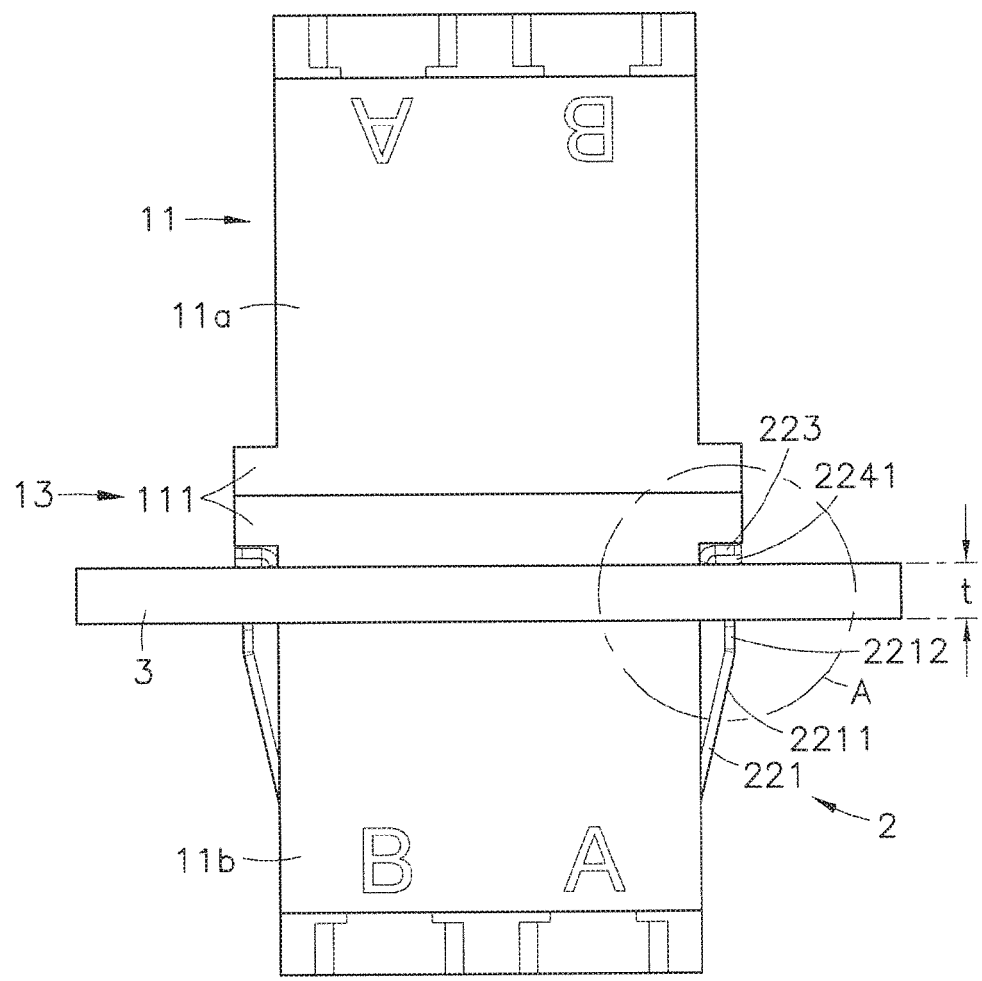
FIG. 7 is a top view of the preferred embodiment of the present disclosure after assembly.
Figure 8:
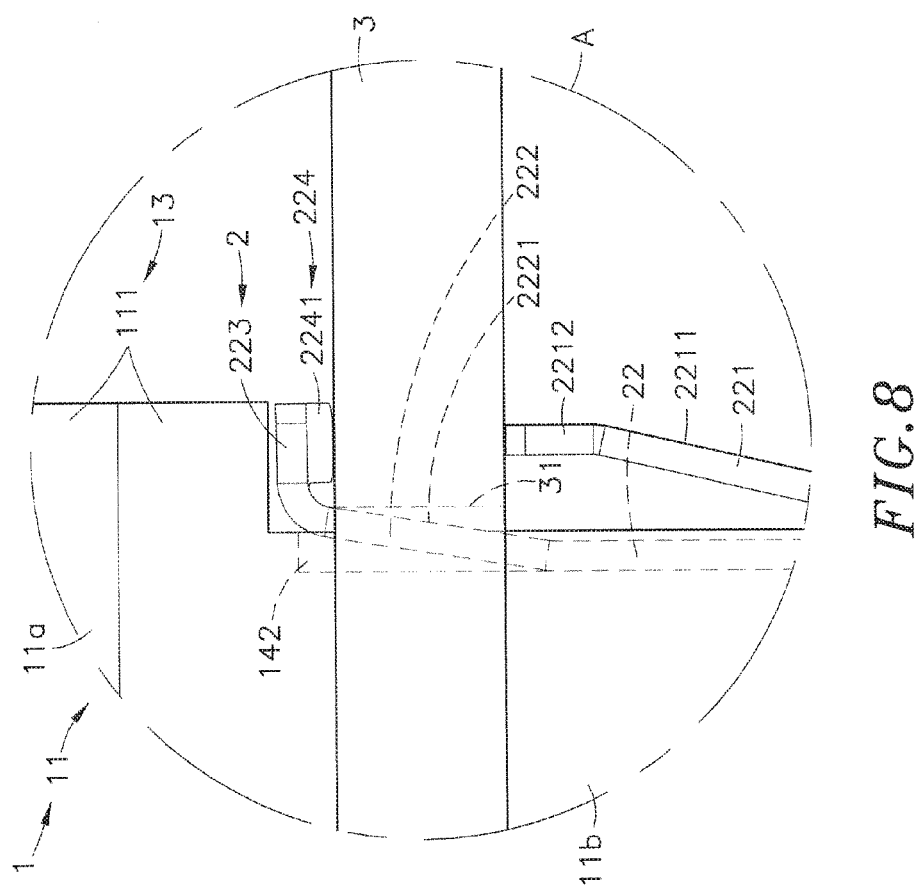
FIG. 8 is a partial enlarged view corresponding to the FIG. 7 of the present disclosure.
Figure 9:
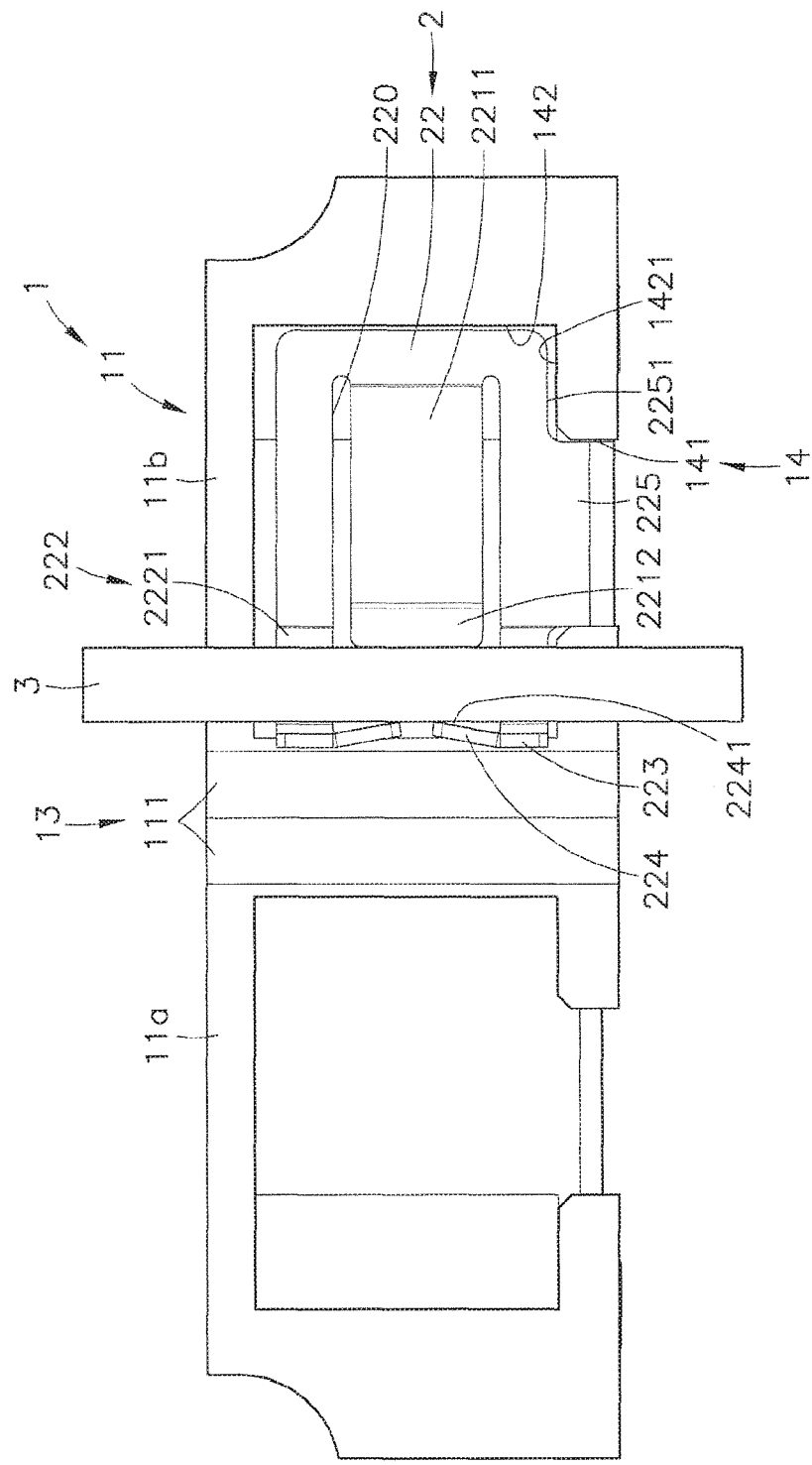
FIG. 9 is a side view of the preferred embodiment of the present disclosure after assembly.
Figure 10:
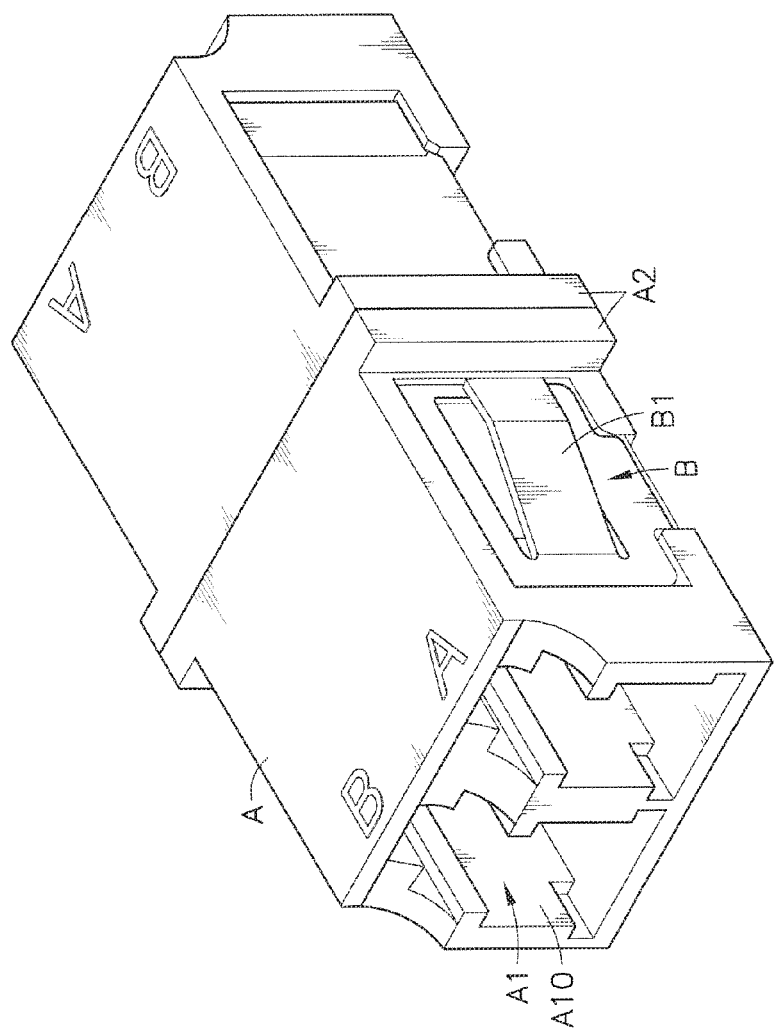
FIG. 10 is an elevational view of a traditional optical fiber adapter.
Figure 11:
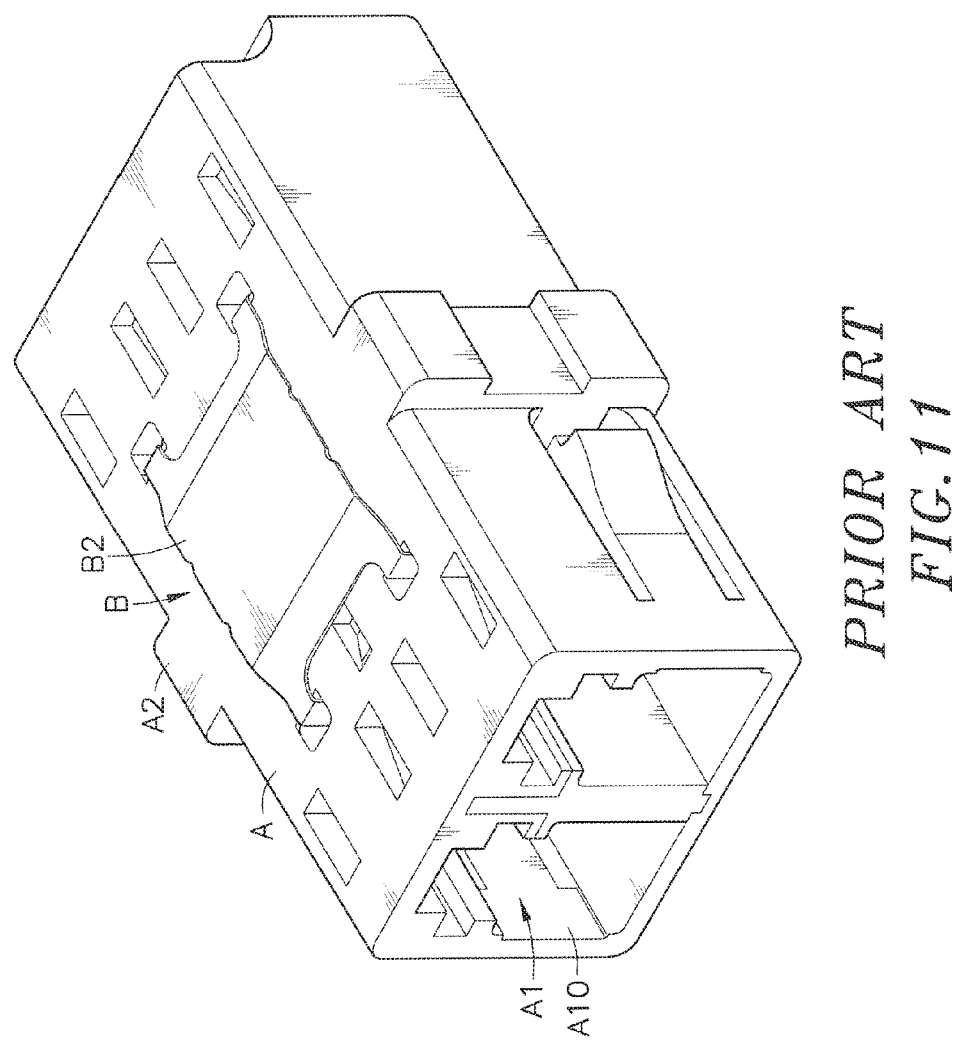
FIG. 11 is an elevational view of other traditional optical fiber adapter.
Figure 12:
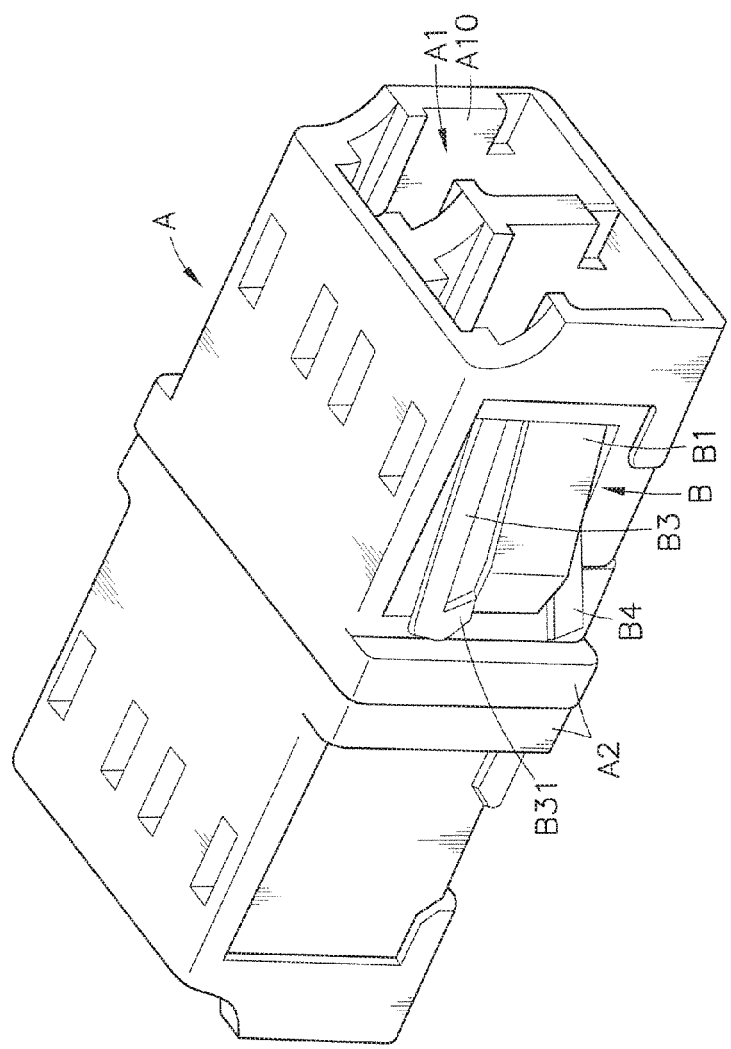
FIG. 12 is an elevational view of another traditional optical fiber adapter.
Figure 13:
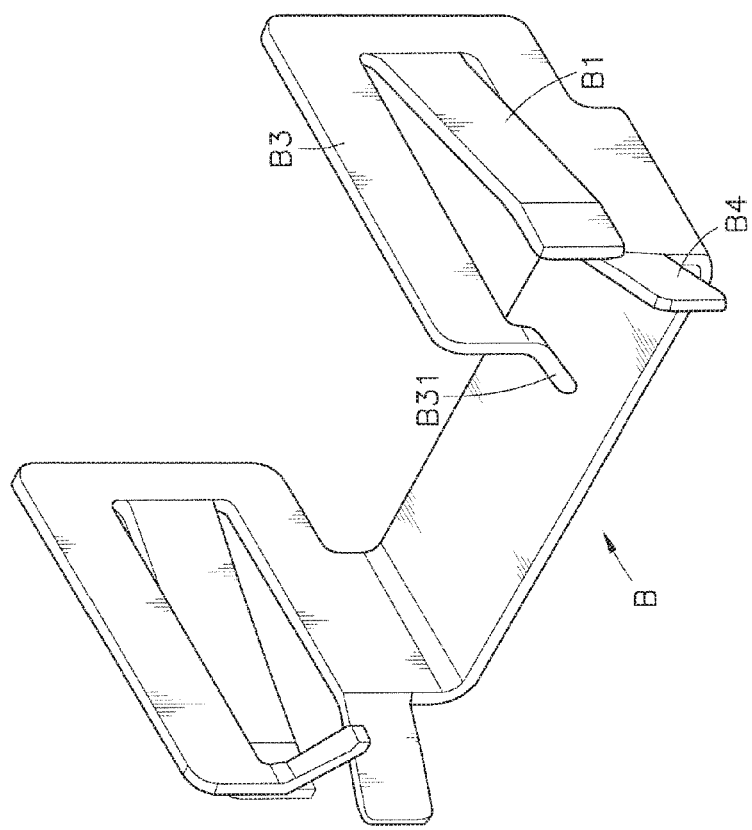
FIG. 13 is an elevational view of a mounting clip for another traditional optical fiber adapter.
Figure 14:
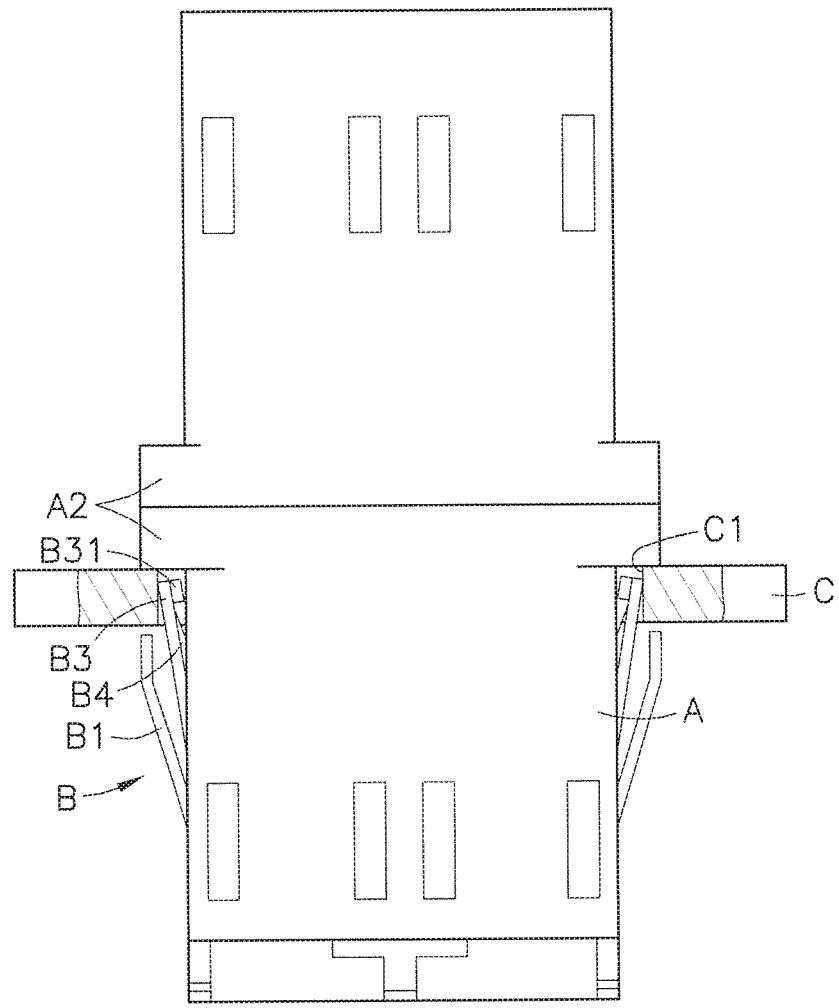
FIG. 14 is a top view illustrating that another traditional optical fiber adapter is mounted on a panel.

Please refer to FIG. 6 through FIG. 9 which respectively show an exploded view of a preferred embodiment of the present disclosure before assembly, a top view of the preferred embodiment of the present disclosure after assembly, and a partial enlarged view and a side view corresponding to the FIG. 7. As shown in FIGs clearly, the tightly mountable optical fiber adapter of the present disclosure can be applied to data center or optical communication system, or utilized in storage equipment, computer peripheral equipment or other information equipment operating in high-speed and having a large volume of storage in a network system. The plurality of shell members 1 assembled with the spring clip 2 can be further installed on a rack-mount panel 3 of an optical fiber connection box, digital matrix board, a fiber optic distribution box or other optical fiber equipment, and a plurality of optical fiber connectors (not shown in FIGs) are inserted into the accommodating cavities 120 through the sockets 1201 of the mating parts 12 of the shell members 1, so that the optical fiber cores of two optical fiber connectors can be respectively inserted into the mounting parts 122 and easily aligned to be connected with each other under the guiding and constraining of the pipe 123, for optical signal transmission.

While the optical fiber adapter of the present disclosure is assembled with the panel 3, the base 11 of the shell member 1 is inserted into an installing hole 31 of the panel 3, to enable the first elastic parts 221 on the two side panels 22 of the spring clip 2 to be respectively abutted against an inner edge of the installing hole 31 firstly, and the shell member 1 is further pushed to transversely move towards the panel 3. After the supporting surfaces 2211 of the first elastic part 221 are reversely pushed by the sidewall of the installing hole 31 and elastically deformed first and restored later, the first elastic part 221 can cross the installing hole 31 to reach the back side of the panel 3 and the clasping ends 2212 of the first elastic part 221 are abutted against the peripheral surface of the installing hole 31. During the process of inserting the base 11, the second elastic parts 222 are passed through and located inside the installing hole 31, the pushing surfaces 2221 of the second elastic parts 222 are reversely pushed by the sidewall of the installing hole 31 to elastically deform, and acted simultaneously with the stop parts 223 which are respectively stopped on the wing parts 13 of the base 11 in a flat state. After the base 11 is fastened, the predetermined distance d formed between the third elastic part 224 and the first elastic part 221 smaller than or equal to a thickness of the panel 3 can enable the third elastic part 224 to be elastically deformed when the pushing surface 2241 of the third elastic part 224 is abutted against the front side of the panel 3, and front and back sides of the panel 3 are clamped by the third elastic part 224 and the first elastic part 221 and no gap exists therebetween. Therefore, the shell member 1 cooperating with the spring clip 2 can be tightly mounted and fastened in the installing hole 31 of the panel 3 to provide more strength against the pulling force, and the entire structure can be securer.

When a plurality of optical fiber connectors are respectively inserted into the accommodating cavities 120 of the mating parts 12 of the shell member 1, the shell member 1 is constrained by the cooperation between the spring clip 2 and the panel 3, and the front and back sides of the panel 3 are respectively clamped by first elastic parts 221 and the third elastic parts 224 on the two side panels 22, and the stop parts 223 are respectively abutted against the wing parts 13 of the shell member 1 to ensure that the panel 3 is clamped by the third elastic part 224 and the first elastic part 221 more tightly. By a manner that the second elastic parts 222 on the two side panels 22 are abutted against the sidewall of the installing hole 31 with elastic deformation, the shell member 1 is not easy to longitudinally swing or transversely shake while the shell member 1 is plugged, pulled or impacted, so the optical fiber adapter of the present disclosure can be securely installed on the panel 3 and hard to fall out of the panel 3. Additionally, by using the structure of clamping the panel 3 by the first elastic part 221 and the third elastic part 224, the optical fiber adapter of the present disclosure can be applied to various panels 3 having different thicknesses and has more practicability and applicability.

The main feature of the present disclosure is that the base 11 of the shell member 1 is combined with a spring clip 2 at the outside thereof, and the side panels 22 at two opposite sides of the base plate 21 are forwardly and obliquely extended to form first elastic parts 221 respectively, and each side panel 22 has the front parts located above and below the first elastic part 221 and extended in the same direction to form the second elastic parts 222, and the ends of the second elastic parts 222 are respectively outwardly bent and extended to form the stop parts 223, and each two stop parts 223 are then inwardly bent towards opposite to each other and extended towards the first elastic part 221 to form the third elastic parts 224. Therefore, the shell member 1 can be transversely inserted into the installing hole 31 of the panel 3, the first elastic parts 221 can cross the installing hole 31 to clasp the back side of the panel 3, the second elastic parts 222 are located in the installing hole 31, and the third elastic parts 224 are abutted with the front side of the panel 3, so that the front and back sides of the panel 3 can be clamped by the third elastic parts 224 and the first elastic parts 221 and no gap exists therebetween, and the shell member 1 can be tightly mounted and combined on the installing hole 31 of the panel 3.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical fiber adapter, comprising:
   a shell member comprising a base defining a transverse cavity extending through the base, the base adapted to receive optical fiber connectors; and
   a spring clip disposed at the outside of the base and cooperating with the shell member to transversely mount into an installing hole of a panel,
   wherein the spring clip comprises a base plate having two opposite side panels formed at two opposite sides thereof, each side panel defines a first elastic part forwardly obliquely extended therefrom and configured to cross the installing hole for clasping a back side of the panel while the shell member is mounted, and each of the side panels has a front part disposed adjacent the first elastic part and a second elastic part extended therefrom in the same direction and configured to be located in the installing hole, and an end of the second elastic part is respectively outwardly bent and extended to form a stop part, each stop part extends towards the first elastic part to form a third elastic part for abutting with a front side of the panel.

2. The optical fiber adapter according to claim 1, wherein the base of the shell member has wing parts protruded at two opposite sides of a central portion thereof, the base further defines a recessed part formed at a bottom wall and two lateral walls thereof after the wing parts for combining with the spring clip, and the stop parts on the two side panels of said spring clip are stopped on said wing parts in a flat state.

3. The optical fiber adapter according to claim 2, wherein the base of the shell member is constructed of a front shell member and a rear shell member, a plurality of lips are respectively protruded from two sides of a junction between the front shell member and the rear shell member, and each two lips are combined to form the wing parts.

4. The optical fiber adapter according to claim 1, wherein a compartment wall is formed at a central portion of the cavity between each of two mating parts of the shell member, and the compartment wall defines two mounting parts having hollow structures, and a pipe is fastened in the two mounting parts.

5. The optical fiber adapter according to claim 1, wherein the base of the shell member defines recessed parts respectively disposed at a bottom wall and two lateral walls of a rear end thereof, and a fastening groove is formed at each of the recessed parts on the bottom wall of the base for mounting the base plate of the spring clip, and two sides of said fastening groove are respectively upwardly extended to two lateral walls of the base to form mounting grooves for receiving the side panel and fastening the spring clip in the recessed parts.

6. The optical fiber adapter according to claim 5, wherein lower parts of the mounting grooves of the recessed part of the shell member define stop parts opposite inwardly bent and formed adjacent to the fastening grooves, arms are respectively formed at lower parts of the two side panels of the spring clip and adjacent to the base plate, and each of the arms has front and back sides which are adjacent to the side panel and opposite inwardly bent to form jointing surfaces for clasping the stop parts for fastening.

7. The optical fiber adapter according to claim 1, wherein a central part of the front side of the side panel of the spring clip defines a hole therethrough and extended near the rear side of the side panel, and the first elastic part which is forwardly obliquely extended from the inner edge of the hole defines a supporting surface at an external surface thereof, a free end of the first elastic part is bent towards the hole and extended to form a clasping end located in parallel with the side panel and configured to clasp a peripheral surface of the installing hole of the panel, and a predetermined distance smaller or equal to the thickness of the predetermined panel is formed between the clasping end of the first elastic part and a free end of the third elastic part.

8. The optical fiber adapter according to claim 1, wherein external surfaces of the second elastic parts of the side panels of the spring clip are outwardly extended to form first pushing surfaces configured to abut against an inner sidewall of the installing hole of the panel with elastic deformation.

9. The optical fiber adapter according to claim 1, wherein the third elastic parts at the side panels of the spring clip respectively define second pushing surfaces formed on external surfaces thereof towards the first elastic part and configured to abut with the front side of the panel with elastic deformation.

10. The optical fiber adapter according to claim 1, wherein said spring clip is a U-shaped metal sheet having two symmetrical side-walls and made of elastic steel material integrally.

11. An optical fiber adapter, comprising:
a shell member comprising a base defining a transverse cavity extending through the base, the base adapted to receive optical fiber connectors; and
a spring clip disposed at the outside of the base and cooperating with the shell member to transversely mount into an installing hole of a panel,
wherein the spring clip comprises a base plate having two opposite side panels formed at two opposite sides thereof, each side panel defines a first elastic part forwardly obliquely extended therefrom and configured to cross the installing hole for clasping a back side of the panel while the shell member is mounted, and each of said side panels has front parts disposed respectively above and below the first elastic part and have second elastic parts extended therefrom in the same direction and configured to be located in the installing hole, and ends of the second elastic parts are respectively outwardly bent and extended to form stop parts, each two stop parts are bent opposite to each other and extended towards said first elastic part to form third elastic parts for abutting with a front side of said predetermined panel.

12. The optical fiber adapter according to claim 11, wherein the base of the shell member has wing parts protruded at two opposite sides of a central portion thereof, the base further defines a recessed part formed at a bottom wall and two lateral walls thereof after the wing parts for combining with the spring clip, and the stop parts on the two side panels of the spring clip are stopped on the wing parts in a flat state.

13. The optical fiber adapter according to claim 2, wherein the base of the shell member is constructed of a front shell member and a rear shell member, a plurality of lips are respectively protruded from two sides of a junction between the front shell member and the rear shell member, and each two lips are combined to form the wing parts.

14. The optical fiber adapter according to claim 11, wherein a compartment wall is formed at a central portion of the cavity between each of two mating parts of the shell member, and the compartment wall defines two mounting parts having hollow structures, and a pipe is fastened in the two mounting parts.

15. The optical fiber adapter according to claim 11, wherein the base of the shell member defines recessed parts respectively disposed at a bottom wall and two lateral walls of a rear end thereof, and a fastening groove is formed at each of the recessed parts on the bottom wall of the base for mounting the base plate of the spring clip, and two sides of the fastening groove are respectively upwardly extended to two lateral walls of the base to form mounting grooves for receiving the side panel and fastening the spring clip in the recessed parts.

16. The optical fiber adapter according to claim 15, wherein lower parts of the mounting grooves of the recessed part of the shell member define stop parts opposite inwardly bent and formed adjacent to the fastening grooves, arms are respectively formed at lower parts of the two side panels of the spring clip and adjacent to the base plate, and each of the arms has front and back sides which are adjacent to the side panel and opposite inwardly bent to form jointing surfaces for clasping the stop parts for fastening.

17. The optical fiber adapter according to claim 11, wherein a central part of the front side of the side panel of the spring clip defines a hole therethrough and extended near the rear side of the side panel, and the first elastic part which is forwardly obliquely extended from the inner edge of the hole defines a supporting surface at an external surface thereof, a free end of the first elastic part is bent towards the hole and extended to form a clasping end located in parallel with the side panel and configured to clasp a peripheral surface of the installing hole of the panel, and a predetermined distance smaller or equal to the thickness of the predetermined panel is formed between the clasping end of the first elastic part and a free end of the third elastic part.

18. The optical fiber adapter according to claim 11, wherein external surfaces of the second elastic parts of the side panels of the spring clip are outwardly extended to form first pushing surfaces configured to abut against an inner sidewall of the installing hole of the panel with elastic deformation.

19. The optical fiber adapter according to claim 11, wherein the third elastic parts at the side panels of the spring clip respectively define second pushing surfaces formed on external surfaces thereof towards the first elastic part and configured to abut with the front side of the predetermined panel with elastic deformation.

20. The optical fiber adapter according to claim 11, wherein the spring clip is a U-shaped metal sheet having two symmetrical side-walls and made of elastic steel material integrally.

\* \* \* \* \*